United States Patent [19]

Hoppe et al.

[11] Patent Number: 4,879,102
[45] Date of Patent: Nov. 7, 1989

[54] REGENERATION OF WASH SOLUTIONS CONTAINING FE(II) AND FE(III) CHELATE COMPLEXES

[75] Inventors: Klaus-Dieter Hoppe, Wachenheim; Bernd Leutner, Frankenthal; Siegfried Schreiner, Ludwigshafen, all of Fed. Rep. of Germany

[73] Assignee: BASF Aktiengesellschaft, Ludwigshafen, Fed. Rep. of Germany

[21] Appl. No.: 251,449

[22] Filed: Sep. 30, 1988

[30] Foreign Application Priority Data

Sep. 30, 1987 [DE] Fed. Rep. of Germany ....... 3732952

[51] Int. Cl.$^4$ .............................................. C01B 21/00
[52] U.S. Cl. .................................................... 423/235
[58] Field of Search ............................ 423/235, 235 D

[56] References Cited

U.S. PATENT DOCUMENTS 4,102,813  7/1978  Kimura et al. ............... 423/213.5 X
4,158,044  6/1979  Takabatake et al.
4,670,234  6/1987  Holter et al.

FOREIGN PATENT DOCUMENTS 2416660  6/1979  Fed. Rep. of Germany.
3430017  6/1987  Fed. Rep. of Germany.

OTHER PUBLICATIONS

Kirk–Othmer, Encyclopedai of Chemical Technology, Second Edition, vol. 3, p. 701.
J. Amer. Chem. Soc., 75, (1953) 215–10, p. 2, lines 7–13.
Kirk–Othmer, Encyclopedia of Chemical Technology, Third Edition, vol. 4, p. 183.
J. Amer. Chem. Soc. 75, 1953, pp. 215–219.

Primary Examiner—Gregory A. Heller
Attorney, Agent, or Firm—Keil & Weinkauf

[57] ABSTRACT

Wash solutions containing Fe(II) and Fe(III) chelate complexes and used for removing $NO_x$ from waste gases are regenerated by treatment with sodium tetrahydroborate.

3 Claims, No Drawings

REGENERATION OF WASH SOLUTIONS CONTAINING FE(II) AND FE(III) CHELATE COMPLEXES

It is known to remove nitrogen oxides ($NO_x$) from waste gases, for example flue gases, by treatment with wash solutions containing dissolved chelate complexes of divalent iron with N-based chelating agents, such as nitrilotriacetic acid (NTA) or ethylenediaminotetraacetic acid (EDTA) (German Laid-Open Application No. DOS 2,416,660). The effect is to absorb the NO with the formation of an Fe(II) chelate NO complex in which one molecule of NO can be incorporated per Fe atom. The NO is reduced by adding a reducing agent, such as sulfite, so that the iron chelate complex becomes available again for the absorption of further NO. This fact can be used to remove $SO_2$ and $NO_x$ out of flue gases in a simultaneous process in which the $SO_2$ is dissolved in the wash solution to form sulfite ions which serve to regenerate the NO-charged iron(II) chelate complex (German Laid-Open Application No. DOS 3,429,663).

However, a disadvantage of this Fe(II) chelate complex process is that the $Fe^{+2}$ is oxidized by the residual oxygen contained in the gases to $Fe^{+3}$ which does not fix the NO. For this reason the wash solution must be continuously regenerated. In the above-cited DOS 3,429,663 this is done by treating a bleed stream from the wash solution with reducing substances such as ascorbic acid, sodium, pyrosulfite or sodium dithionite. An addition thereto, German Laid-Open Application DOS 3,430,017, additionally proposes metallic iron, for example in the form of powder or filings, and also sodium bisulfite. Of these reducing agents, sodium dithionite is the only one which is industrially usable, while for example sodium bisulfite, pyrosulfite, ascorbic acid and metallic iron do not bring about a complete reduction of the $Fe^{+3}$. Sodium is out of the running from the start because of handling difficulties.

It is an object of the present invention to provide, for reasons of flexibility, a further reducing agent for the regeneration of wash solutions containing Fe(II) and Fe(III) chelate complexes and used for removing $NO_x$ from flue gases which is inexpensive and easy to handle and guarantees quantitative reduction of $Fe^{+3}$ to $Fe^{+2}$.

We have found that this object is achieved with sodium tetrahydroborate as reducing agent.

Surprisingly, if sodium tetrahydroborate is used for regenerating the wash solutions, the $Fe^{+3}$ is only reduced to $Fe^{+2}$, although it is known that iron(II) solutions react with sodium tetrahydroborate to form black precipitates which presumably consist of borides which in turn catalyze the decomposition of sodium tetrahydroborate to a marked degree (Schlesinger, J. Amer. Chem. Soc. 75 (1953), 215-19).

Sodium tetrahydroborate can be added to the wash solutions in a solid pulverulent form or in the form of aqueous solutions which for example have $NaBH_4$ contents of from 20 to 30% by weight and have advantageously been made alkaline. The reaction can be carried out at from 20 to 80° C., i.e. at temperatures at which the wash solutions are generally present. It is advantageous to carry out the reaction at a pH of 5 to 9, at which neither marked decomposition of the sodium tetrahydroborate nor precipitation of iron hydroxides occurs.

The sodium tetrahydroborate is added on the basis of a reduction equivalent of 8 per mole in an amount which is at least stoichiometrically sufficient to convert the $Fe^{+3}$ into $Fe^{+2}$. Advantageously, it is added in an excess of from 40 to 100% above the stoichiometrically required amount without, surprisingly, bringing down any precipitates of the said borides.

In the Examples which follow, the process according to the invention is illustrated in more detail.

The determination of Fe(III) in the Examples below was carried out as follows:

25 ml of the solution under test were admixed with 200 ml of 16% strength by weight HCL, and the mixture was extracted with 200 ml of 4-methyl-2-pentanone. The 4-methyl-2-pentanone phase was then extracted with 100 ml of $H_2O$. After the addition of 5 ml of 1 M $NaHCO_3$ solution, 10 ml of concentrated HCL and 7.5 g of potassium iodide, this aqueous phase was left in the dark for 10 minutes. After the addition of 2 ml of 2% strength by weight starch solution it was titrated with 0.1 M sodium thiosulfate solution, the end point being indicated by the change in color from blue to colorless.

EXAMPLE 1

A solution was prepared at pH 6.4 containing per liter 59.2 g of $Na_2SO_3$, about 26 g of EDTA and also 4.5 g of Fe(III) and 1.5 g of Fe(II). On addition of 15.8 g of $Na_2SO_3$ the Fe(III) content decreased to 3.4 g/L (0.06 mol of Fe/L) and was not decreased any further even by longer reaction times.

1 liter of this starting solution thus pretreated was admixed at pH 6.45 and T=25°C. by dropwise addition and stirring with a solution of 0.585 g of $NaBH_4$ (0.12 reduction equivalents) in 10 ml of $H_2O$, and the pH changed to 6.2. Thereafter the solution no longer contained any detectable Fe(III).

EXAMPLE 2

One liter of the starting solution of Example 1 was admixed at pH 6.45 and T=25°C. by dropwise addition and stirring with 1.95 g of an alkali (pH 11.8) 30% strength by weight $NaBH_4$ solution (0.12 reduction equivalents) in $H_2O$, and the pH changed to 6.15. After the reaction had ended (5 minutes), the solution no longer contained any detectable Fe(III).

EXAMPLE 3

One liter of the starting solution of Example 1 was admixed at pH 6.45 and T=28°C. with 0.58 g of solid $NaBH_4$ (0.12 reduction equivalents) by stirring. The pH dropped to 6.2. After the reaction had ended (5 minutes), the solution no longer contained any detectable Fe(III).

EXAMPLE 4

100 ml of the starting solution of Example 1 (0.016 mol of $Fe^{+3}$) was admixed at pH 8.9 by dropwise addition and stirring with 0.585 g of a 10% strength by weight $NaBH_4$ solution (0.012 reduction equivalents). Thereafter the solution no longer contained any detectable Fe(III).

EXAMPLE 5

One liter of the starting solution of Example 1 was admixed at pH 6.45 and T=60° C. by dropwise addition with 1.46 g of an alkali (pH 11.8), 30% strength by weight $NaBH_4$ solution, and the pH had changed to 6.19. After the reaction had ended (2 minutes), the solution no longer contained any detectable Fe(III).

COMPARATIVE EXAMPLE

A solution containing 6 g of Fe(II) per liter was admixed with a 10% strength by weight $NaBH_4$ solution by dropwise addition. A black precipitate formed at once.

We claim:

1. A process for regenerating a wash solution containing Fe(II) and Fe(III) chelate complexes and used for removing $NO_x$ from a waste gas comprising adding an effective amount of sodium tetrahydroborate to a wash solution containing Fe(II) and Fe(III) chelate complexes at a pH of from 5 to 7 and at a temperature of from 20 to 80°C. to reduce the Fe(III) contained in the wash solution to Fe(II).

2. The process of claim 1, wherein the sodium tetrahydroborate is added to the wash solution in a solid pulverulent form or in the form of an aqueous solution.

3. The process of claim 2, wherein the sodium tetrahydroborate is added in the form of an aqueous solution, said aqueous solution containing 20 to 30% by weight of said sodium tetrahydroborate.

* * * * *